United States Patent [19]

Eisele

[11] Patent Number: 5,207,198
[45] Date of Patent: May 4, 1993

[54] SYSTEM FOR CONTROLLING THE FUEL QUANTITY OF INTERNAL COMBUSTION ENGINES

[75] Inventor: Hermann Eisele, Vaihingen/Enz, Fed. Rep. of Germany

[73] Assignee: Robert Bosch GmbH, Stuttgart, Fed. Rep. of Germany

[21] Appl. No.: 671,907
[22] PCT Filed: Jun. 29, 1990
[86] PCT No.: PCT/DE90/00489
  § 371 Date: Mar. 20, 1991
  § 102(e) Date: Mar. 20, 1991
[87] PCT Pub. No.: WO91/01441
  PCT Pub. Date: Feb. 7, 1991

[30] Foreign Application Priority Data
Jul. 20, 1989 [DE] Fed. Rep. of Germany ....... 3924077

[51] Int. Cl.[5] ............................................. F02D 31/00
[52] U.S. Cl. .................................... 123/357; 123/494; 192/0.08
[58] Field of Search ............... 123/357, 358, 359, 494; 192/0.08, 0.09, 0.092, 0.062

[56] References Cited
U.S. PATENT DOCUMENTS 3,645,366 2/1972 Numazawa ............................. 192/8
4,502,438 3/1985 Yasuhara ............................. 123/357
4,594,979 6/1986 Yasuhara ............................. 123/357
4,917,063 4/1990 Hiraki ................................. 123/357
4,947,813 8/1990 Vainshtein .......................... 123/357
5,079,710 1/1992 Brauninger ......................... 123/357

FOREIGN PATENT DOCUMENTS
100453 10/1980 Japan.
094830 9/1985 Japan.
257332 4/1987 Japan.
037239 7/1987 Japan.

Primary Examiner—Carl S. Miller
Attorney, Agent, or Firm—Edwin E. Greigg; Ronald E. Greigg

[57] ABSTRACT

A system for avoiding the effects of jerking in the drive train of a motor vehicle driven by an internal combustion engine, comprising a device for limiting the quantity of fuel supplied to the combustion chambers of the engine controlled with the aid of a transducer for measuring the approach of two coupling parts of a coupling mounted in the drive shaft to the gearing system of the motor vehicle. If a value of a predetermined approach speed is exceeded, then the drive torque output by the engine is reduced, by reducing the fuel quantity, such that the coupling parts come into contact gently with one another. After that, the output torque of the engine can be further increased arbitrarily.

32 Claims, 1 Drawing Sheet

SYSTEM FOR CONTROLLING THE FUEL QUANTITY OF INTERNAL COMBUSTION ENGINES

PRIOR ART

The torque output by an internal combustion engine is substantially determined by the quantity of fuel made available for combustion per combustion event. For this purpose, the fuel can be metered directly into the combustion chamber, as is the case with self-igniting engines (Diesel engines), or can be made available via a fuel-air mixture that is ignited externally, as known for the Otto engine. Both these cases will be addressed as "fuel metering" or "fuel quantity" hereinafter.

The invention is based on a method generically defined hereinafter. Such a method is known for instance from German Auslegeschrift 12 56 944, in which with the aid of a torque sensor, if there is an increase in the proportion of fuel in the charge of the engine combustion chambers, for a given proportion of air, it is ascertained whether the torque output is increased further or is dropping. If the torque is dropping, then the proportion of fuel is limited to a maximum value via a governor. Such a method is known as performance optimization. In engines for use in passenger cars, which may either have externally supplied ignition or be self-ignited (Diesel engines), it is also known to mount a so-called predamper between a flywheel and the vehicle gears. The predamper is intended to prevent gear rattle during engine idling, if this engine does run unevenly in this operating range. A predamper of this kind has a carrier, which is for instance mounted on the part of the drive shaft toward the engine that leads to the gearing system. The carrier is located between two stops, which are disposed on the flywheel, which is mounted on the part of the drive shaft toward the gearing system. The arrangement may also be done vice-versa, with the flywheel on the part of the drive shaft toward the engine. Soft springs that deflect in and counter to the direction of rotation are disposed between the carrier and the stops, and tend to retain the carrier in an intermediate position between the stops and to intercept the fluctuations in drive rpm, which could be transmitted by the engine to the gearing system.

Only during idling are the rotational speed fluctuations of the engine intercepted by the springs. Upon a load increase, or in other words when the torque to be output by the engine is increasing, contrarily, the very soft springs are rapidly overridden, and the carrier comes jerkily into contact with the stops of the flywheel, since the carrier is accelerated before the increased torque can be effectively transmitted to the gear side. In this case, the springs are too soft to serve as a transmission element. Harder springs, on the other hand, cannot perform the desired compensation for the fluctuating drive rpm during idling. As soon as the carrier is in contact with the stops, a form-fitting coupling exists in the direction of rotation toward the gearing system and toward the power takeoff side of the vehicle. In modern motor vehicles, for noise abatement purposes, the engines are suspended very softly in the body. Accordingly, with the vehicle, they form a structure capable of vibration. The jerky contact of the carriers with the stops of the flywheel leads to an unpleasant bucking vibration in the vehicle, which may build up still further under some circumstances, depending on engine characteristics and how the engine is mounted and on the properties of the vehicle.

ADVANTAGES OF THE INVENTION

By the method of the invention as defined herein with the aid of detecting the approach of the coupling parts, carriers and flywheel to one another, it is possible to provide that a certain approach speed is not exceeded, thus attaining a gentle transition between low load and high load during acceleration. In particular, this avoides the disadvantages mentioned at the outset above. This method can also be used with engines provided with a gearing system and used for instance for stationary drive purposes where there is a varying power requirement.

Advantageous further features of the invention are disclosed hereinafter.

DRAWING

One exemplary embodiment of the invention is shown in the drawing and described in further detail in the ensuing description.

DESCRIPTION

Figure 1:
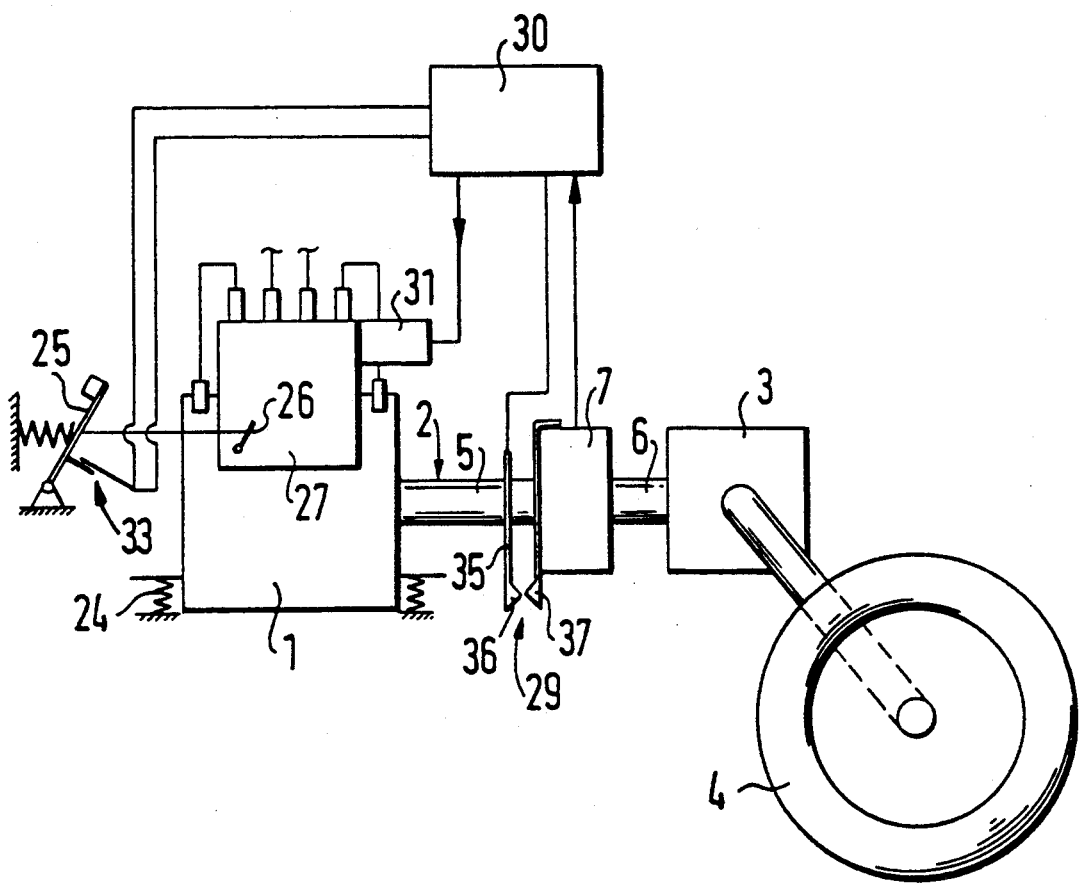
FIG. 1 shows a schematic representation of the drive train of a motor vehicle.
Figure 2:
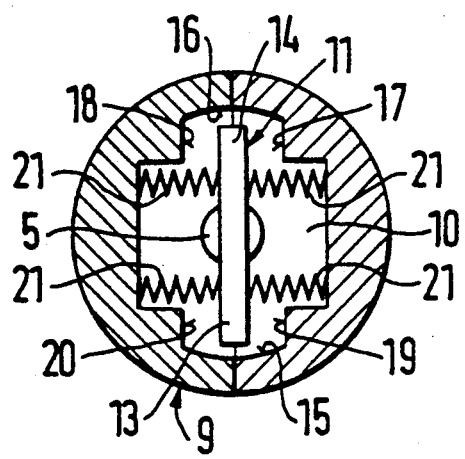
FIG. 2 shows a section through a coupling integrated with a flywheel on the drive shaft between the engine and the gears of the motor vehicle.

FIG. 1, in highly simplified form, shows an internal combustion engine 1 that is connected via a drive shaft 2 to a gearing system 3 of a motor vehicle. The gearing system 3 drives an undercarriage, of which only one vehicle wheel 4 is shown. The drive shaft is embodied in two parts, with a drive shaft part 5 toward the engine and a drive shaft part 6 toward the gearing system, both of them coupled to one another via a coupling 7 embodied as a predamper. The predamper or coupling is shown in section in FIG. 2, likewise schematically, and substantially comprises a flywheel 9 with a middle recess 10, into which a coupling carrier 11, as one of the coupling parts, protrudes; the carrier is connected to the drive shaft part 5 coming from the engine 1. The other part of the coupling 7 comprises the flywheel. The carrier 11 in FIG. 2 has two carrier arms 13 and 14 offstanding diametrically from the drive shaft 5; they protrude into two opposed pockets 15 and 16 of the recess 10. The pockets are defined by stop faces 17, 18, 19 and 20, opposing one another circumferentially of the flywheel, and the arms 13 and 14 of the carrier 11 come to rest on the stop faces during their relative rotation to the flywheel 9 and thus enter into a form-fitting coupling with the flywheel 9. In the position of repose, that is, when there is no load on the gear side, the arms 13, 14 are spaced apart from the stops 17–20 by compression springs 21. This is true in particular for idling as well, in which gear rattle is to be avoided. If a torque is transmitted from the drive shaft 5 to the drive shaft part 6 counter to a corresponding driving resistance, then the carrier rotates counter to the force of the compression springs 21 until it contacts the stops 17–20. Only when the torque to be transmitted is very low, such as that that must be brought to bear during idling, can the compression springs 21 compensate for nonuniformity for the drive rotation driving from the engine, so that in the gearing system 3 the force transmission parts remain in form-fitting contact with one another, and gear rattle is prevented. If a large jump in torque occurs with an increase in load, however, then the compression springs 21 are rapidly overridden, and the arm 13, 14 come into contact with the stops of the flywheel 9 very quickly. This leads to the aforementioned jerk, causing the engine 1 in its mount 24 to start vibrating. This effect makes itself felt particularly disadvantageously if the motor vehicle is to be accelerated from the overrunning state, because here the rotational angle via which the carrier can be accelerated to the flywheel is still larger than in the case of an increase in load from idling. With a gas pedal firmly seated in the vehicle body, the relative motion of the engine with respect to the gas pedal can additionally cause a change in the setting of a quantity adjusting lever 26, for instance, of a fuel injection pump 27 supplying the engine, thereby worsening the running of the engine and the motor vehicle still further. Even the motor vehicle driver, as an entity capable of vibration, can have negative influences if he actuates the gas pedal without being aware of it. In the exemplary embodiment of FIG. 1, a fuel injection pump is shown schematically; it should be noted that the engine can be supplied with fuel by an intake manifold fuel injection system or by a carburetor, instead of by an injection pump, depending on the type of combustion involved.

Now, in order to avoid the jerky transmission of force to the gearing system, a proximity sensor 29 is disposed between the carrier 11 and the flywheel in a feature of the invention, and detects the relative rotation between the carrier 11 and flywheel 9, or the degree of approach of the arms 13, 14 of the carrier 11 to the stops 17–20, and in particular detects the approach speed, and carries it on to a control unit 30. The control unit influences the fuel metering of the fuel injection pump 27, for example, which can be done with the aid of a full-load stop 31 of a known type. The maximum amount of fuel attaining injection per combustion event, and thus the maximum torque that can be output by the engine in the acceleration situation, are limited electromagnetically or electrohydraulically.

However, the intervention may be done in some other way, such as via a provision in the transmission of the adjusting travel between the gas pedal and the governor action on the quantity adjusting device of the fuel injection pump. This may for instance be done in the region of the adjusting lever, which determines the setting of the governor spring of a mechanical governor of the fuel injection pump, or, in the case of electronic actuation of the adjusting lever, in the region of the electrical triggering of this actuation. Intervention via the electrical control system, in the case of an electrically controlled injection pump, is equally possible.

The control unit 30 also, in a known manner, receives control signals via the gas pedal 25, with the aid of a gas pedal position sensor 33, for the desired torque or change in torque as indicated by the driver. Depending on these indications and as a function of possibly other operating parameters of the engine, the fuel injection quantity is then either limited or controlled directly by the control unit in a manner known per se. In that case, the mechanical transmission of motion between the gas pedal and the quantity adjusting lever 26 provided on the outside of the fuel injection pump, or corresponding devices in the case of mixture producers, such as carburetors for engines with externally supplied ignition, are dispensed with.

To avoid jerky transmission of force to the gearing system and thus to avoid jerky vibration and gear rattle when there is an increase in torque, the differential speed of the coupling parts to one another at the instant they strike one another must not exceed a certain maximum value. The allowable differential speed depends on the rpm, the inertia of the parts to be connected, the engine mounting, and the type of governing or control of the fuel quantity, as well as other parameters that effect the excitability to vibration of the composite unit comprising the driver, the vehicle and the engine. Set-point values can be measured and specified in performance graphs. If then the coupling parts have come into contact with one another, the torque can be increased unrestrictedly in the usual manner, for instance even to the value already initially intended at the onset of torque increase.

That is, if the driver demands a change in torque of the engine, which is accordingly detected by the actuation of the gas pedal 25, then the fuel quantity per combustion event first increases, thereby increasing the rpm. At the same time, the approach of the carrier 11 to the stops of the flywheel 9 is monitored, and if a certain approach speed or a certain degree of approach is exceeded, the power output is limited by controlling the fuel quantity per combustion event, so that as a result the carrier is pressed gently onto the stops; a maximum allowable approach speed of the carrier toward the stops is not exceeded, thus avoiding force transmission events that incite bucking.

The stable contact of the arms on the stops 17–20 is likewise detected by the proximity sensor, and from then on the quantity of fuel is increased in the otherwise usual manner, in accordance with the indicated desired torque, or in accordance with the load.

The control unit may be embodied such that at a fixed distance of the carrier rotationally from the stops, it limits the increase in fuel quantity to a fixed minimum value, which is adapted so as to enable virtually jerk-free contact of the carrier at a maximum allowable differential speed. From the time of this contact of the carrier on the stops, the limitation of the increase in fuel quantity is cancelled, and the particular fuel quantity demanded at a given time is established. However, the control unit may also set a value that is still lower compared with that above, or a higher value, for the fuel quantity per combustion event and can vary it, with a measured, increasing approach or approach speed of the carrier to the stops, such that the contact of the carrier still takes place with little jerking in an allowable manner. The measured approach or the degree of approach is compared with a predetermined set-point value, and depending on the outcome of comparison the fuel quantity is limited so as to adhere to the set-point value or attain the contact with little jerking. Finally, it is also possible to control the fuel quantity in a manner that is basically analogous to the approach or the approach speed. This can be performed as a governing process in a known manner.

Bucking has still other effects, depending on how the vehicle and engine are equipped and on their operating state. Accordingly, the set-point value can be controlled as a function of operating parameters of the engine and/or motor vehicle. Measured values can be stored in memory in a performance graph and called up in one or more dependent functions. Thus, the set-point value can be varied as a function of the instantaneous rpm, the vehicle speed, the load or degree of proximity of the coupling parts to one another, the actual approach speed or differential speed of these parts, or finally the differential speed referred to the instantaneous rpm, in order to achieve optimal contact of the coupling parts with one another to avoid damaging vibration and bucking.

Figure 3:
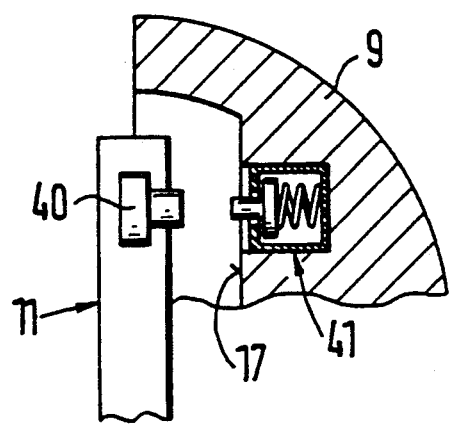
FIG. 3 is a fragmentary portion of the coupling of FIG. 2, with a schematically shown proximity sensor.

The proximity sensor shown in FIG. 1 comprises a disk 35, connected to the drive shaft 5 toward the engine, and this disk has one or more teeth 36, which are disposed opposite teeth 37 correspondingly provided on the flywheel 9. By means of the control unit, the relative rotational position, or the relative motion, of the teeth 36, 37 is then detected. This kind of detection is known per se and need not be described in detail here. The sensor 29 shown in FIG. 1 then corresponds to an angle measuring method. Such a method may for instance in a known manner also be achieved by two gear wheels provided with face toothing, one of which is mounted on the drive shaft 5 toward the engine and the other on the flywheel. The toothing of these gear wheels, which are rotatable relative to one another, is sampled via respective stationary sensors, and the relative angle of rotation is ascertained from this. FIG. 3 shows an alternative version of a proximity transducer, having a transmitter part 40 connected to the carrier 11 and a receiver part 41 connected to the flywheel 9; the receiver part can also be resiliently adjustable, in order upon contact of the carrier 11 with the stop 17 on the flywheel wheel 9 to detect this fact by means of control contacts and accordingly to cancel the limitation of the increased rate of the fuel quantity. This compensates for dimensional tolerances. One possible sensor in this case is a Hall effect sensor or an ultrasound proximity sensor. It is also possible to use capacitive sensors or other travel measuring methods.

I claim:

1. A system for controlling the quantity of fuel brought to combustion per combustion event in the combustion chambers of an internal combustion engine serving in particular to drive motor vehicles via a drive shaft comprising first and second drive shaft parts, including a transducer for producing a signal due to a rotation of said first and second drive shaft parts (5, 6) toward one another in a rotational direction, said transducer produces a control signal for varying the fuel quantity, said transducer is embodied as a proximity switch (29), which detects the approach of a first rotating coupling part (11) of said first drive shaft part (5) of said two-part drive shaft (2) of the engine to a second rotating coupling part (9) on said second drive shaft part (6) of the drive shaft (2) between the engine and a gearing system following the engine, wherein the coupling parts are adjustable counter to a restoring force (21) biasing between one another until mutually form-fitting contact on one another takes place, and for an existing distance between the two coupling parts the fuel quantity or the increase in fuel quantity is controlled such that a predetermined differential speed as the two coupling parts come to contact one another is not exceeded, and that after the coupling parts are in contact with one another this control of the fuel quantity is cancelled and the fuel quantity is controlled by other operating parameters of the engine.

2. A method for controlling the quantity of fuel brought to combustion per combustion event in the combustion chambers of an internal combustion engine of a motor vehicle having a two part drive shaft leading away from an engine toward a power take off including first and second coupling parts which comprises detecting a signal of a transducer which detects rotational approach of the first drive shaft part (5) toward the engine relative to said second drive shaft part (6) toward the power takeoff to produce a control signal for varying the fuel quantity, directing the control signal to a control unit (30), determining a gas pedal setting, and directing a control signal according to the gas pedal setting to said control unit, directing a signal from said control unit to a fuel injection quantity control according to signals received from said transducer and said gas pedal setting to control an amount of fuel directed to said engine.

3. A method as defined by claim 2, in which said transducer measures the distance of the coupling parts from one another upon load increase, and if a distance exists, the fuel quantity is limited to a low maximum value.

4. A method as defined by claim 2, in which upon a load increase, a measurement is made as to whether a distance exists between the coupling parts, and the approach speed of the coupling parts to one another is measured, compared with a predetermined set-point value and in accordance with the outcome of comparison, the fuel quantity is automatically adjusted to adhere to the set-point value.

5. A method as defined by claim 2, in which upon a load increase, a measurement is made as to whether the coupling parts are spaced apart from one another, and if they are spaced apart, the fuel quantity is limited to a predetermined value, which is increased or lowered with increasing proximity of the coupling parts, depending upon the outcome of a comparison between the instantaneous approach speed and a set-point value.

6. A method as defined by claim 3, in which a set-point value is variable as a function of operating parameters of the engine of the motor vehicle.

7. A method as defined by claim 3, in which a set-point value is variable as a function of rpm of the engine of the motor vehicle.

8. A method as defined by claim 3, in which a set-point value is variable as a function of the degree of approach of the coupling parts to one another.

9. A method as defined by claim 3, in which a set-point value is variable as a function of the approach speed, referred to the instantaneous engine rpm.

10. A method as defined by claim 3, in which a set-point value is variable as a function of the load.

11. A method as defined by claim 3, in which a set-point value is variable as a function of the speed of approach of the coupling parts to one another.

12. A method as defined by claim 4, in which the set-point value is variable as a function of operating parameters of the engine of the motor vehicle.

13. A method as defined by claim 5, in which the set-point value is variable as a function of operating parameters of the engine of the motor vehicle.

14. A method as defined by claim 4, in which the set-point value is variable as a function of rpm of the engine of the motor vehicle.

15. A method as defined by claim 5, in which the set-point value is variable as a function of rpm of the engine of the motor vehicle.

16. A method as defined by claim 4, in which the set-point value is variable as a function of the degree of approach of the coupling parts to one another.

17. A method as defined by claim 5, in which the set-point value is variable as a function of the degree of approach of the coupling parts to one another.

18. A method as defined by claim 4, in which the set-point value is variable as a function of the approach speed, referred to the instantaneous engine rpm.

19. A method as defined by claim 5, in which the set-point value is variable as a function of the approach speed, referred to the instantaneous engine rpm.

20. A method as defined by claim 4, in which the set-point value is variable as a function of the load.

21. A method as defined by claim 5, in which the set-point value is variable as a function of the load.

22. A method as defined by claim 4, in which the set-point value is variable as a function of the speed of approach of the coupling parts to one another.

23. A method as defined by claim 5, in which the set-point value is variable as a function of the speed of approach of the coupling parts to one another.

24. A method as defined by claim 2, in which upon a load increase, a measurement is made as to whether a distance exists between the coupling parts, and the approach of the coupling parts to one another is measured, compared with a predetermined set-point value and in accordance with the outcome of comparison, the fuel quantity is automatically adjusted to adhere to the set-point value.

25. A method as defined by claim 2, in which upon a load increase, a measurement is made as to whether the coupling parts are spaced apart from one another, and if they are spaced apart, the fuel quantity is limited to a predetermined value, which is increased or lowered with increasing proximity of the coupling parts, depending upon the outcome of a comparison between the approach and a set-point value.

26. A method as defined by claim 3, in which a set-point value is variable as a function of operating parameters of the engine and of the motor vehicle.

27. A method as defined by claim 3, in which a set-point value is variable as a function of rpm of the engine and a function of the speed of the motor vehicle.

28. A method as defined by claim 3, in which a set-point value is variable as a function of the degree of approach of the coupling parts to one another.

29. A method as defined by claim 4, in which the set-point value is variable as a function of operating parameters of the engine and motor vehicle.

30. A method as defined by claim 5, in which the set-point value is variable as a function of operating parameters of the engine and motor vehicle.

31. A method as defined by claim 4, in which the set-point value is variable as a function of rpm of the engine and a function of the speed of the motor vehicle.

32. A method as defined by claim 5, in which the set-point value is variable as a function of rpm of the engine and a function of the speed of the motor vehicle.

* * * * *